(12) United States Patent
Robinson et al.

(10) Patent No.: US 10,705,177 B2
(45) Date of Patent: Jul. 7, 2020

(54) METHOD AND SYSTEM FOR DETERMINING AN UNAMBIGUOUS ANGLE OF ARRIVAL USING INTERFEROMETRY

(71) Applicant: RAYTHEON COMPANY, Waltham, MA (US)

(72) Inventors: Ian S. Robinson, Waltham, MA (US); Bradley A. Flanders, Waltham, MA (US)

(73) Assignee: Raytheon Company, Waltham, MA (US)

( * ) Notice: Subject to any disclaimer, the term of this patent is extended or adjusted under 35 U.S.C. 154(b) by 289 days.

(21) Appl. No.: 15/978,718

(22) Filed: May 14, 2018

(65) Prior Publication Data

US 2019/0346533 A1    Nov. 14, 2019

(51) Int. Cl.
*G01S 3/48* (2006.01)
*G01S 3/06* (2006.01)
*G01S 3/04* (2006.01)

(52) U.S. Cl.
CPC ............... *G01S 3/48* (2013.01); *G01S 3/043* (2013.01); *G01S 3/06* (2013.01)

(58) Field of Classification Search
CPC ..... G01S 3/48; G01S 3/043; G01S 3/46; G01S 3/06; G01S 3/023; G01S 5/06
USPC ......................................................... 342/442
See application file for complete search history.

(56) References Cited

U.S. PATENT DOCUMENTS

| | | | |
|---|---|---|---|
| 5,497,161 A | 3/1996 | Tsui | |
| 6,255,991 B1 | 7/2001 | Hedin | |
| 2018/0024219 A1* | 1/2018 | Zhang | ........................ G01S 3/28 342/417 |
| 2019/0324107 A1* | 10/2019 | Robinson | .............. G01S 13/883 |

* cited by examiner

*Primary Examiner* — Harry K Liu
(74) *Attorney, Agent, or Firm* — Burns & Levinson, LLP; Joseph M. Maraia (57) ABSTRACT

A direction finding interferometer shares receivers among antennas and aperiodically switches between those antennas. The phase differences for a subset of the antenna pairs are measured for each pulse and the results are combined with the results from subsequent pulses to resolve ambiguities. An angle of arrival common to two subsets of angles of arrival is the unambiguous angle of arrival.

23 Claims, 8 Drawing Sheets

METHOD AND SYSTEM FOR DETERMINING AN UNAMBIGUOUS ANGLE OF ARRIVAL USING INTERFEROMETRY

GOVERNMENT RIGHTS

N/A

BACKGROUND

Electronic Support (ES) and Radar Warning Receiver (RWR) systems need to precisely find Angles of Arrival (AoA) of RF emitters, including frequency agile emitters, as rapidly as possible in order to precisely determine direction. As known, direction finding is important in supporting jamming and other tactical applications. For pairs of antennas spaced many wavelengths apart, phase interferometry is capable of highly precise AoA measurements with less than 1° error, but multiple ambiguous angles of arrival are computed, caused by the periodic nature of the phase difference related to the geometric angle. Antennas spaced less than one-half wavelength apart have less precise AoA measurements. Many ES and RWR systems use a single antenna and receiver to cover a broad spectrum, e.g., 2-18 GHz, so antenna spacing at one-half of the largest wavelength may represent many multiples of the smallest wavelength. Further, many platforms are already outfitted with antennas spaced many wavelengths apart to provide coverage at all azimuths about the platform.

Time Difference of Arrival (TDOA) direction finding may be used to compute AoA over a span of 180° without ambiguity. The time delay between two antennas is monotonic with respect to geometric angle changing from 0° to 90° (and conversely from −90° to 0°), but TDOA provides relatively low AoA precision. Amplitude comparison direction finding generally provides a similarly coarse AoA precision. Improved AoA precision may be achievable using Frequency Difference of Arrival (FDOA) techniques, however FDOA requires stable emitter signal frequencies for long periods of time, e.g., $10^{ths}$ of seconds, seconds, or many seconds, depending on platform velocity and desired AoA precision, thus limiting the number of threats that can be simultaneously geolocated and limiting applicability to threats with a constant frequency.

In comparison, an interferometer can provide precision AoA in a single pulse time, e.g., microseconds to milliseconds. Interferometers in ES (RWR) systems, however, require a number of receivers to provide unambiguous Angle of Arrival (AoA). Receivers can be costly in dollars or power/thermal requirements, especially when they must be mounted on the exterior of an airborne platform. As receiver cost is proportional to bandwidth/data rate and the trend is to increase receiver bandwidth to deal with increasingly wideband and agile emitters, the costs have increased significantly.

A prior attempt to address the use of interferometers for AoA determination implemented a method to cover the entire spectrum of interest in one mode using N receivers but with a lower average data rate and then to switch the same receivers to perform interferometry while being vigilant over the whole spectrum.

What is needed is a further improvement to interferometry for determining a location of an RF emitter.

SUMMARY

According to one aspect of the disclosure, a method of determining an unambiguous angle of arrival (AoA) of a signal from an emitter comprises (a) coupling a first receiver to an antenna in a first sub-set of antennas of an array of antennas, wherein the first receiver is only coupled to one antenna at a time; (b) coupling a second receiver to an antenna in a second sub-set of antennas of the array, wherein no antenna in the second sub-set is in the first sub-set of antennas and wherein the second receiver is only coupled to one antenna at a time; (c) receiving, respectively, at the first and second receivers, first and second components of a first signal from the emitter detected at the corresponding antenna; (d) measuring a frequency and phase difference between the received first and second components; (e) calculating a set of ambiguous angles of arrival (AAoA) of the first signal as a function of the measured phase difference; (f) collecting the calculated AAoA into a set of AAoAs associated with a combination defined by: (i) the first signal, (ii) the antenna to which the first receiver is connected and (iii) the antenna to which the second receiver is connected; (h) coupling the second receiver to another antenna of the second sub-set of antennas and repeating steps (c)-(f) a predetermined number of times; (i) repeating step (h) a predetermined number of times; and (j) identifying an AAoA common to each set of AAoAs as the unambiguous AoA of the first signal.

In another aspect of the present disclosure, a method of determining an unambiguous angle of arrival (AoA) of a signal from an emitter comprises (a) switchably coupling a first receiver to only one antenna at a time, the one antenna in a first sub-set of antennas of an array of antennas; (b) switchably coupling a second receiver to only one antenna at a time, the one antenna in a second sub-set of antennas of the antenna array, wherein no antenna in the first sub-set is in the second sub-set of antennas; (c) receiving, respectively, at the first and second receivers, first and second components of a first signal from the emitter detected at the corresponding antenna; (d) measuring a phase difference between the received first and second components; (e) calculating an ambiguous angle of arrival (AAoA) of the first signal as a function of the measured phase difference; (f) collecting the calculated AAoA into a set of AAoAs associated with a combination defined by: (i) the first signal, (ii) the antenna to which the first receiver is connected and (iii) the antenna to which the second receiver is connected; (h) switchably coupling one or both of the first and second receivers to any one other antenna of the respective sub-set of antennas and repeating steps (c)-(f) a predetermined number of times; (i) repeating step (h) a predetermined number of times; and (j) identifying an AAoA common to each set of AAoAs as the unambiguous AoA of the first signal.

A system for determining an unambiguous angle of arrival (AoA) of a signal from an emitter, in accordance with an aspect of the present disclosure, comprises an array of linearly arranged antennas comprising first and second sub-sets of antennas, wherein no antenna in the second sub-set is in the first sub-set; a switching device coupled to the antenna array and configured to: switchably couple one first sub-set antenna at a time to a first output and switchably couple one second sub-set antenna at a time to a second output; a first receiver coupled to the first output of the switching device; a second receiver coupled to the second output of the switching device; and a processor, coupled to the switching device and the first and second receivers, configured to implement a method of: (a) coupling, via the switching device, the first receiver to an antenna in the first sub-set of antennas; (b) coupling, via the switching device, the second receiver to an antenna in the second sub-set of antennas; (c) receiving, respectively, from the first and second receivers, first and second components of a first signal from the emitter detected at the corresponding antenna; (d) measuring a phase difference between the received first and second components; (e) calculating an ambiguous angle of arrival (AAoA) of the first signal as a function of the measured phase difference; (f) collecting the calculated AAoA into a set of AAoAs associated with a combination defined by: (i) the first signal, (ii) the antenna to which the first receiver is connected and (iii) the antenna to which the second receiver is connected; (h) coupling, via the switching device, the second receiver to another antenna of the second sub-set of antennas and repeating steps (c)-(f) a predetermined number of times; (i) repeating step (h) a predetermined number of times; and (j) identifying an AAoA common to each set of AAoAs as the unambiguous AoA of the first signal.

BRIEF DESCRIPTION OF THE DRAWINGS

Various aspects of the disclosure are discussed below with reference to the accompanying Figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The Figures are provided for the purposes of illustration and explanation and are not intended as a definition of the limits of the disclosure. In the Figures.

DETAILED DESCRIPTION

In the following detailed description, details are set forth in order to provide a thorough understanding of the aspects of the disclosure. It will be understood by those of ordinary skill in the art that these may be practiced without some of these specific details. In other instances, well-known methods, procedures, components and structures may not have been described in detail so as not to obscure the aspects of the disclosure. Preliminarily, it should be noted that the RF signals that are referenced herein may be referred to as pulsed signals, however, doing so does not limit the scope of the disclosure to such signals. As used herein, the term signal may refer to a pulsed or continuously transmitted waveform originating at an emitter. In the case that the emitter emits pulsed signals, some or all of a pulse may be received and processed. In the case of a continuous wave signal, the signal may be received for an initial and subsequent intervals.

Generally, and as will be described in more detail herein, a direction finding interferometer shares receivers among antennas and aperiodically switches between those antennas. The phase differences for a subset of the antenna pairs are measured for each pulse and the results are combined with the results from subsequent pulses to resolve ambiguities. The measurements between antennas spaced at S result in ambiguous angles of arrival (AoAs). Ambiguity spacing depends on $\lambda/S$. Further, Time Difference of Arrival (TDOA) and/or amplitude is optionally used on each pulse to limit an angular range of the AoA ambiguity pattern match.

Advantageously, the number of and/or the SWAP of receivers in the interferometer system in accordance with the present disclosure is reduced compared to known systems. Further, for example, two receivers are shared between more than two antennas to perform unambiguous interferometry. In other words, sharing M receivers amongst N antennas, where M<N. In one approach, as will be described herein in more detail, two receivers are connected to four antennas using two two-position switches. Alternatively, one receiver is connected to one antenna and another receiver is connected to a three-position switch to couple the latter receiver to one of three other antennas.

An approach to determining the AoA is described in U.S. patent application Ser. No. 15/492,694, filed Apr. 20, 2017, by Ian S. Robinson, et al., entitled "Interferometric Time Delay Of Arrival," which is commonly owned with this current application and which is herein incorporated by reference for all purposes. Another approach to determining AoA is set forth in U.S. patent application Ser. No. 15/492,712, filed Apr. 20, 2017, by Ian S. Robinson, et al., entitled "Disambiguated Direction Finding," which is also commonly owned with this current application and which is also herein incorporated by reference for all purposes.

The Ser. No. 15/492,694 application describes, among other things, a direction finding system comprising an antenna pair, a receiver, and one or more signal processor(s) for providing a precision AoA estimate of pulse signals incident on antenna elements of an antenna pair. A signal processor may comprise a phase interferometry (PI) calculator, a TDOA calculator, and an AoA ambiguity resolver. The antenna elements are separated by a distance that may be many meters which is typical on existing aircraft.

Figure 1:
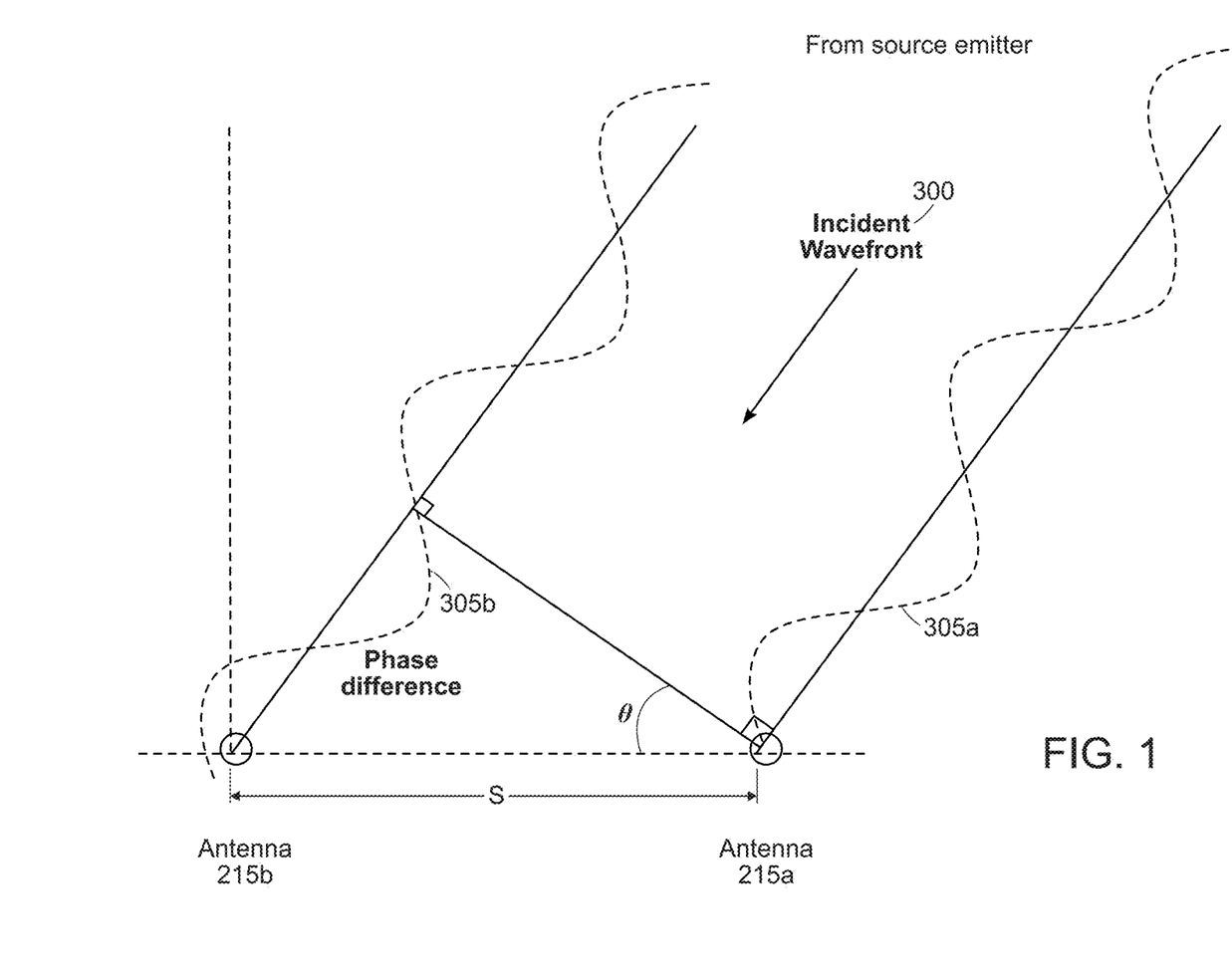
FIG. 1 is an illustration of a signal wavefront incident on a pair of antennas as is known in the art.

Per the Ser. No. 15/492,694 application, geometric relations among an incident RF signal wavefront 300 from a source emitter received at antennas 215a, 215b as a first signal component 305a and a second signal component 305b are present as set forth in FIG. 1. A path difference between the signal components 305a, 305b may be expressed as $d=s*\sin\theta$, where $\theta$ comprises a line drawn from the first antenna 215a normal to a signal path of the second signal component 305b and $s$ is a distance between the antennas 215a and 215b. The time difference of arrival (TDOA) between the signal components 305a, 305b may be expressed as $$\Delta t = \frac{s * \sin\theta}{c},$$

where c is the speed of light. The phase difference of arrival may be given as $$\Delta\varphi = \frac{2\pi * s * \sin\theta}{\lambda}.$$

However the measured phase difference will be between 0 and $2\pi$, $$\Delta\varphi = \mathrm{mod}\left(\frac{2\pi * s * \sin\theta}{\lambda}, 2\pi\right).$$

It is understood that TDOA and PI AoA measurements each contain uncertainty.

With regard to TDOA error, the uncertainty is proportional to a time measurement error estimate associated with the measurement equipment, and may be empirically derived or may result from an analysis of the equipment's design. The range of TDOA AoA solutions comprises a single solution plus or minus the associated error (which may have a Gaussian shape). For example, the TDOA error is proportional to the baseline distance s and is roughly independent of pulse signal frequency, and may be expressed as $$\sigma_{\sin\theta} = \frac{c}{s} * \sigma_t.$$

The PI AoA solutions also contain an uncertainty due to phase measurement errors, which may be expressed by $$\sigma_{\sin\theta} = \frac{\lambda}{s}\left(\frac{\sigma_\varphi}{2\pi}\right).$$

However, the largest uncertainty of PI solutions is due to a modulo ($2\pi$) phase measurement error, which may be expressed by $$\Delta_{\sin\theta} = \frac{\lambda}{s}$$

which describes the pattern of the ambiguities. The expression sine, is a set of values from nominally −1 to 1 with a separation of $\lambda/s$, that is, $2\ s/\lambda$. When one takes the ArcSin to determine $\theta$, the pattern is not equal separation, but is approximately so, as shown in the series of FIGS. 5A-5D, as discussed below in more detail. When the separation s or wavelength $\lambda$ (or frequency) changes, the spacing of the ambiguities changes. This means that the entire pattern cannot overlap. Selection of the spacing differences can ensure that overlaps are widely separated, or ideally unique.

That is, the number of possibly correct AoA solutions resulting from PI direction finding techniques increases with signal carrier frequency (or goes inverse to signal wavelength) and increases with wider antenna baseline spacing. When s is wider than $$\frac{\lambda_{pulse}}{2},$$

the set of PI AoA estimates has approximately $$\frac{2s}{\lambda}$$

ambiguous results ("ambiguities") over the full hemisphere from −90° to 90° (or sin $\theta$ from −1 to 1). If any other technique allows the angles to be constrained to ±40 degrees; then the number of ambiguities can be reduced to $$\frac{2s}{\lambda}\frac{\Delta\theta}{90}.$$

Figure 2:
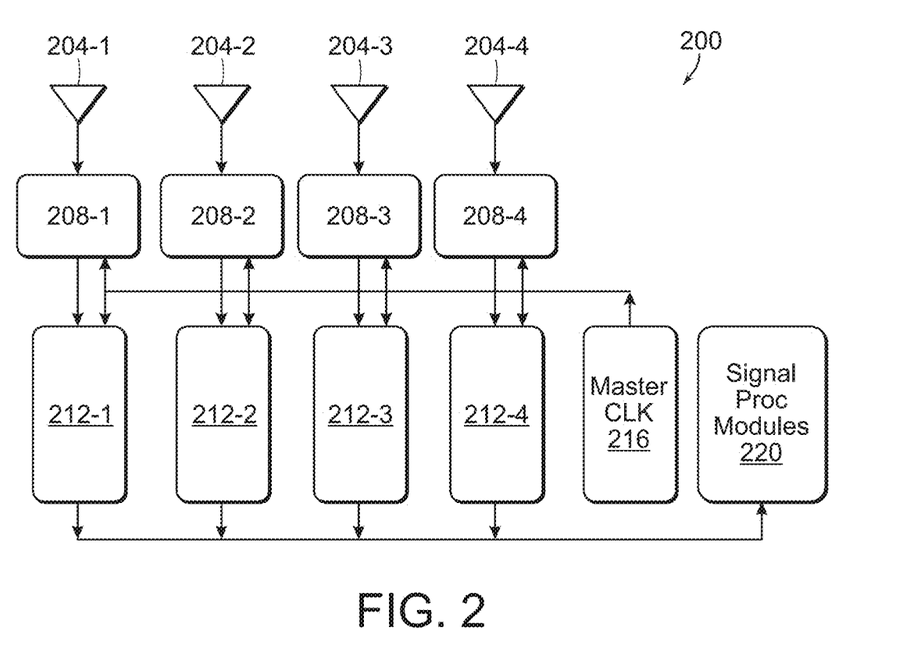
FIG. 2 is a known ESM/RWR receiver system using interferometry.

A known ESM/RWR receiver system 200 using interferometry is shown in FIG. 2. As shown, each of four antennas 204-*x* is respectively coupled to a down converter 208-*x* that is coupled to a respective ADC 212-*x*. A master clock 216 provides timing to the down converters 208-*x* and the ADCs 212-*x*. A signal processing module 220 is coupled to the ADCs 212-*x*.

In operation of the known system 200, the antennas 204-*x* are scanned to cover the spectrum and perform direction finding (DF) when a signal of interest from an emitter is found or identified. These channels can be tuned independently over 100 s of MHz or even >1 GHz and the down converters 208-*x* may also contain a filter bank of filters that parse the spectrum into chunks. An angle of arrival is determined using interferometry with the antennas 204-*x* tuned to a common spectral band and a common local oscillator (LO), if one is employed. Three phase differences are measured for every pulse and an angle of arrival (AoA) can be declared after one pulse but is typically reported after several pulses have been received.

Figure 3:
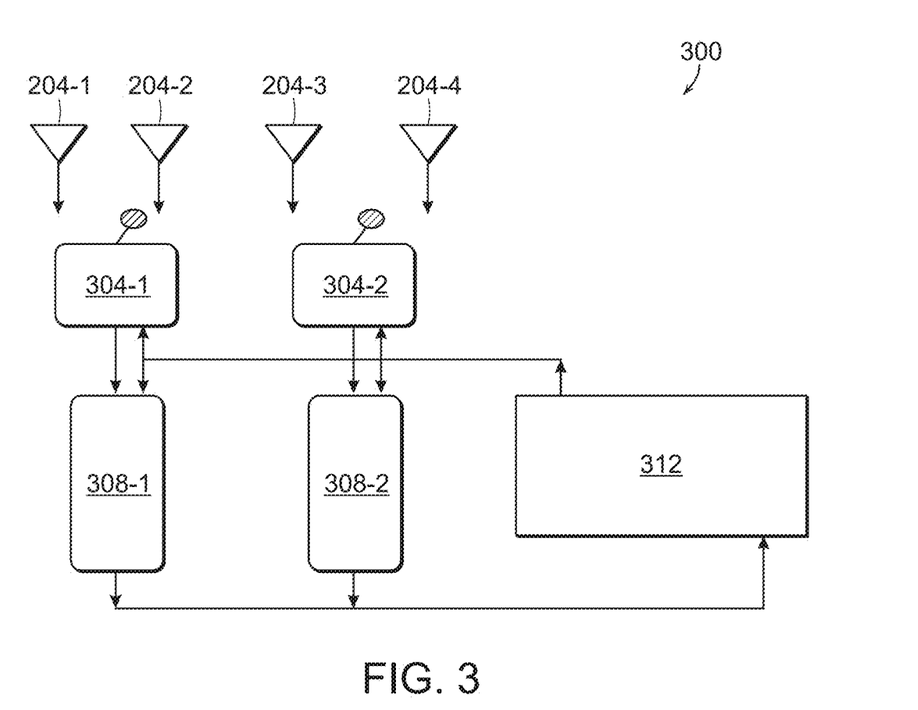
FIG. 3 is a block diagram of a system for determining an unambiguous angle of arrival (AoA) of a signal from an emitter in accordance with an aspect of the present disclosure.

A system 300 for determining an unambiguous AoA of a signal from an emitter in accordance with an aspect of the present disclosure is presented in FIG. 3. The antennas 204-1 and 204-2 are coupled to a first switch 304-1 and the antennas 204-3 and 204-4 are coupled to a second switch 304-2. A first receiver 308-1 is coupled to the first switch 304-1 and a second receiver 308-2 is coupled to the second switch 304-2. Each receiver 308-*x* is configured to only receive signals from one or the other of two specific antennas 204-*x*. In addition, there is no antenna common to both receivers.

A processor 312 is coupled to the switches 304-*x* and the receivers 308-*x*. The processor 312 controls the switches 304-*x* to direct a signal from one of the two antennas to the receiver for processing. It should be noted that each receiver 308-*x* may optionally include a down converter, operating as known to one of ordinary skill in the art, or the receiver may be configured to directly sample the RF waveform with, for example, an analog-to-digital converter.

As discussed in more detail below, the processor 312 operates to switch each receiver 308-*x* between two antennas 204-*x* at aperiodic intervals and to scan the antennas to cover the desired spectrum and perform direction finding (DF) when a signal of interest is detected. Using interferometry, an AOA is determined after switching from one antenna to the other, generally in a time period of 100 μsec-1 ms. The signal processing performed in the processor 312 includes forming Pulse Descriptor Words (PDWs) and comparing at two or more switch times.

Advantageously, the system 300 can determine the AoA using fewer receivers, i.e., down converters, ADCs, etc., than known systems.

The antennas 204-x are linearly arranged with different spacing between each in order to facilitate resolving ambiguities in the AoA. In one non-limiting example, assuming there are four antennas arranged in order from 204-1 to 204-4, a system 300 capable of covering signals in a range of 6-18 GHz, is set up where a distance between antennas 204-1 and 204-2 is 2.46 inches; between antennas 204-2 and 204-3 is 2.82 inches; and between antennas 204-3 and 204-4 is 4.22 inches. In another aspect of the present disclosure, the different distances between the antennas are mutually prime.

Figure 4:
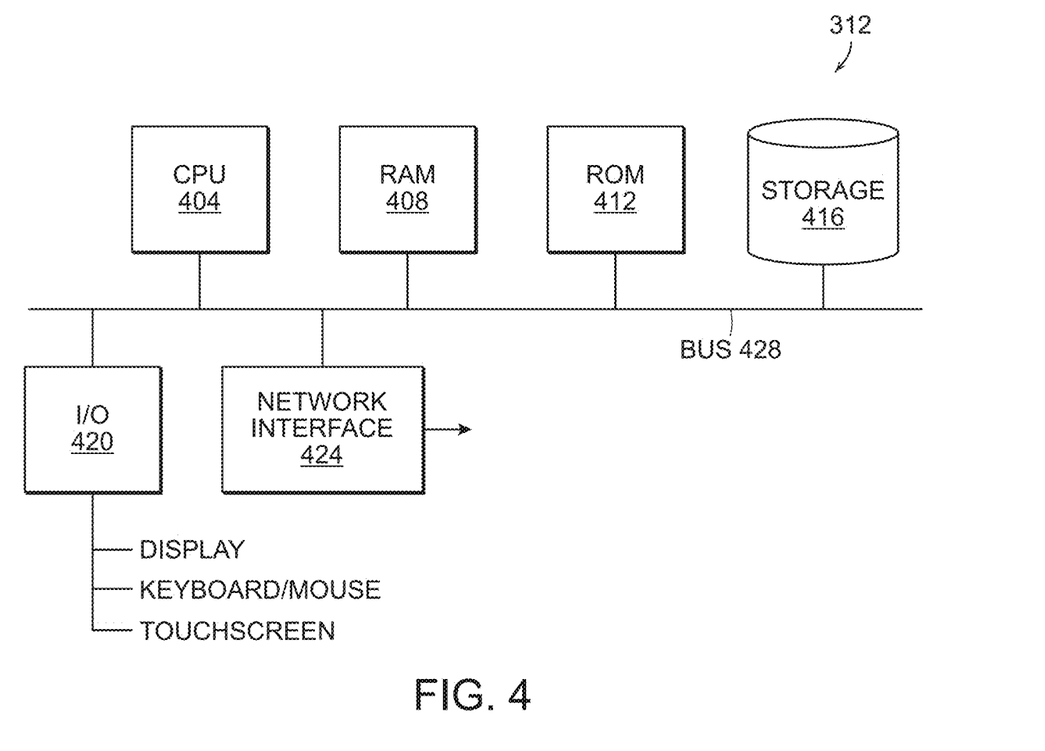
FIG. 4 is a block diagram of a computer system.

Referring to FIG. 4, the processor 312 may be implemented as a system that may comprise a CPU 404, RAM 408, ROM 412, a mass storage device 416, for example, a disk drive, an I/O interface 420 to couple to, for example, display, keyboard/mouse or touchscreen, or the like and a network interface module 424. All of these modules are in communication with each other through a bus 428. The CPU 404 executes an operating system to operate and communicate with these various components.

Figure 5A:
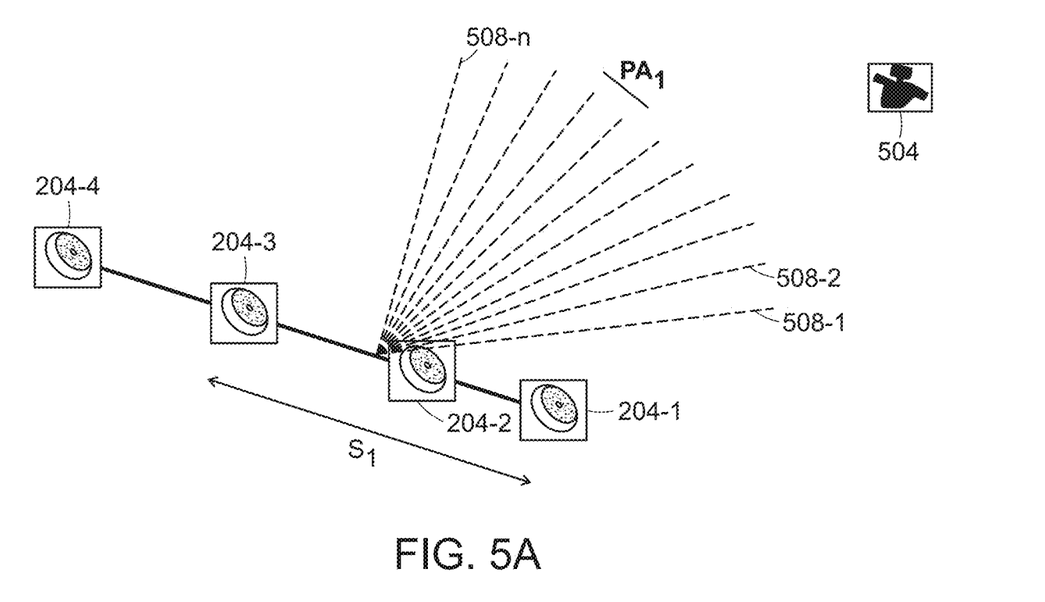
FIG. 5A is a representation of operation of an aspect of the present disclosure.

Referring now to FIGS. 5A-5D, the antennas 204-x are linearly arranged as shown. An emitter 504, for example, an airplane, emits an RF signal. Consider, for example, referring to FIG. 3, that antennas 204-1 and 204-3 are coupled to the receivers 308-1, 308-2, respectively. As shown in FIG. 5A, a first plurality of ambiguous angles of arrival (AAoA) 508-1 to 508-n are calculated. There is a certain amount of phase ambiguity $(PA_1)=\lambda/S_1$ radians, where $S_1$ is the spacing between antennas 204-1 and 204-3.

Figure 5B:
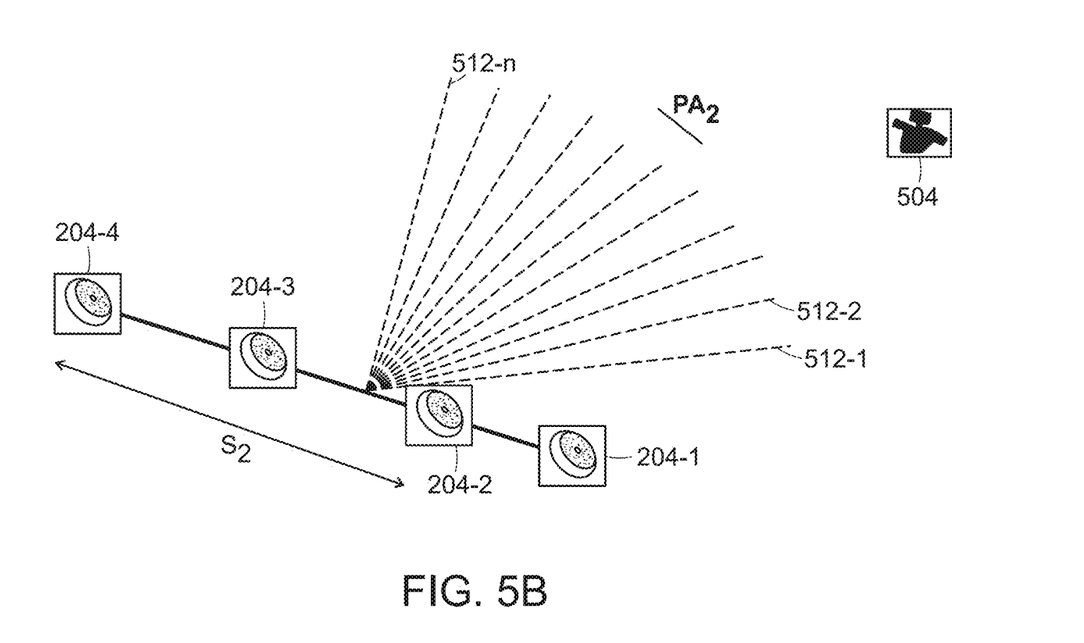
FIG. 5B is a representation of operation of an aspect of the present disclosure.
Figure 5C:
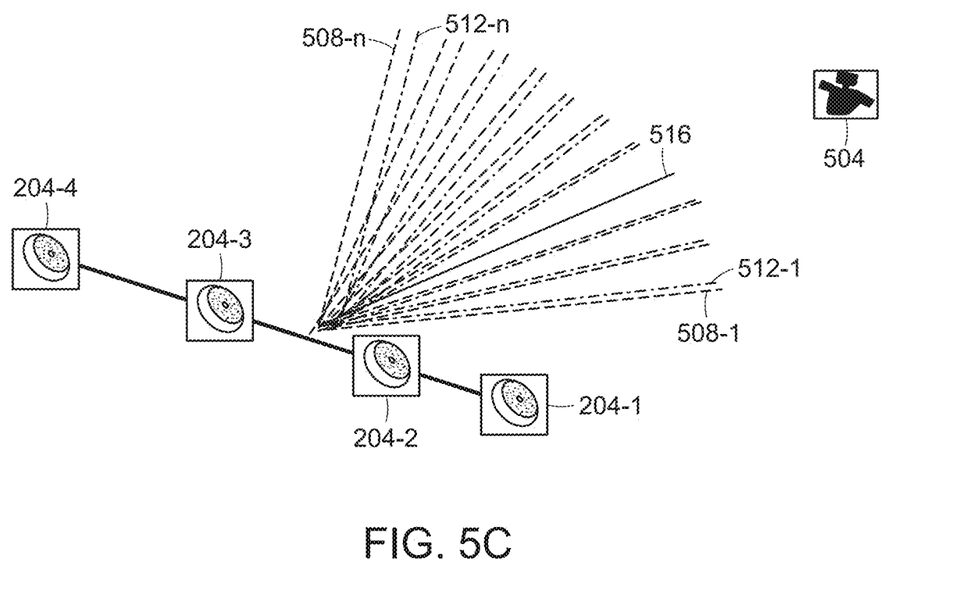
FIG. 5C is a representation of operation of an aspect of the present disclosure.

A second plurality of AAoA 512-1 to 512-n are calculated when the receivers 308-1, 308-2 are respectively coupled to antennas 204-2 and 204-4, as shown in FIG. 5B. There is a certain amount of phase ambiguity $(PAM)=\lambda/S_2$ radians, where $S_2$ is the spacing between antennas 204-2 and 204-4.

The unambiguous AoA of the emitter 504, however, is found in each of the first plurality 508-1 to 508-n and second plurality 512-1 to 512-n of AAoAs. In accordance with an aspect of the present disclosure, the unambiguous AoA is determined by combining the data from the switched pairs of antennas and identifying the common AAoA 516, as graphically presented in FIG. 5C.

In accordance with an aspect of the present disclosure, a method 700 of determining an unambiguous angle of arrival (AoA) of a signal from an emitter 504, per operation of the system 300, will be described with respect to FIGS. 7, 7A and 7B. As will be discussed below, there are two versions of the method 700.

Initially, step 704, a first receiver 308-1 is coupled to an antenna 204-1 in a first sub-set of antennas (204-1, 204-2) wherein the first receiver 308-1 is only coupled to one antenna at a time and a second receiver 308-2 is coupled to an antenna 204-3 in a second sub-set of antennas (204-3, 204-4) and is only coupled to one antenna at a time. No antenna in the second sub-set is in the first sub-set of antennas. A next step 708 includes receiving, respectively, at the first and second receivers 308-1, 308-2, first and second components of a first signal from the emitter 504 detected at the corresponding antenna. In a first version of the method, the frequency f, the respective times of arrival and phase (I) are measured, then the phase difference $\Delta\phi$ between the receivers are measured or calculated, step 712(a), and a set of ambiguous angle of arrival (AAoA) of the first signal as a function of the measured frequency f, phase $\phi$ and phase difference $\Delta\phi$ is calculated, step 716(a). A database of AAoA sets is initiated, step 718, where each set of AAoA is stored with its corresponding frequency f and phase difference $\Delta\phi$. The AAoA sets are not in a specific order as it is a list of AAoA sets that are checked against new AAoA sets. At step 720, the first and second receivers 308-1, 308-2 receive first and second components of a next signal from the emitter 504 detected at the corresponding antenna. The frequency, i.e., the center frequency, phase and phase difference are measured or calculated, step 724(a), and a new set of ambiguous angle of arrival (AAoA) is calculated, step 728(a).

At step 732 it is determined if there is a common AoA within the database of AAoA sets. The definition of "common" is based on a predetermined tolerance is determined from the AoA measurement errors from one pulse to the next, i.e., how consistent the measurements are expected to be. If there is no common AoA, control passes to step 736, as a new emitter has been identified and another set of AAoA is added to the database.

If, at step 732, it is determined that there is one common AoA then at step 740 an unambiguous AoA is assigned to the detected emitter and, step 742, the unambiguous AoA for the emitter is reported.

If, at step 732, it is determined that there are a few, i.e., more than one but not all, AoAs in common then, at step 744 the common members of the set are retained and averaged.

If, at step 732, it is determined that the AoA are all in common then, at step 748 each member of a matching set of ambiguous AoA is averaged.

At step 752, control passes back to step 720 and the process steps 720-740 are repeated, as long as new pulses are being measured, for each pulse while in the same, i.e., the current, receiver configuration.

At step 754, one or both of the first receiver 308-1 and the second receiver 308-2 is coupled or switched, respectively, to another antenna in the first sub-set or second sub-set of antennas. Thus, the configuration of the receivers and antennas is changed. Subsequently, at step 760, the process steps 720-740 are repeated for each pulse while in the current, i.e., new or recently changed, receiver configuration.

At step, 764 one or both of the first receiver 308-1 and the second receiver 308-2 is coupled or switched, respectively, to another antenna in the first sub-set or second sub-set of antennas. Thus, the configuration of the receivers and antennas is changed again and step 768 initiates the repetition of the process steps 720-740 which are repeated for each pulse while in the current, i.e., new, receiver configuration.

It should be noted that the switching of the receivers can be performed asynchronously and with variable periods.

In one approach, each set of ambiguous AoA in the database may be assigned an ID and/or tag to identify each set with the corresponding frequency f and the antennas used to receive the signal. When a set of AAoA is refined by averaging or retaining only common AoAs, a new ID would not be assigned as, in that case, the system is homing in on the unambiguous AoA for that emitter. When a new set is added to the database, that would get a new ID.

Figure 5D:
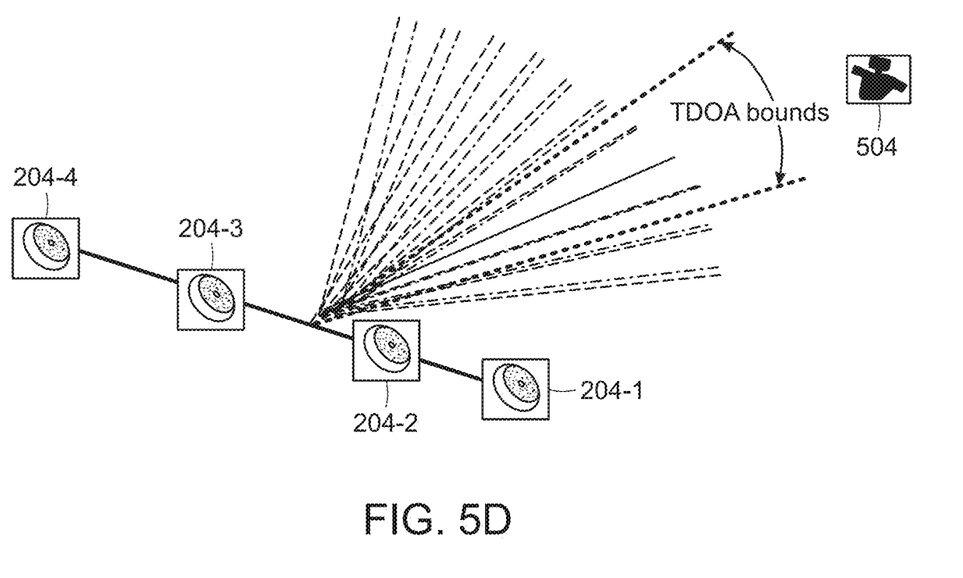
FIG. 5D is a representation of operation of an aspect of the present disclosure.

In an alternate mode of operation, referring now to FIG. 5D, as shown, a TDOA error bound or range can be "overlaid" on the AAoAs in order to reduce the number of ambiguous angles of arrival that have to be considered. While a TDOA determination is unambiguous, it is less precise. Advantageously, implementing the TDOA error bound overlay can eliminate many of the potential ambiguous AoAs from consideration and facilitate finding a single common, unambiguous AoA. The difference in the set after applying TDOA is represented in FIG. 5D. As shown, rather than the AoA pattern extending from −90° to +90°, the pattern only extends from the TDOA estimate, i.e., its maximum possible error to the TDOA estimate plus its max possible error.

This also enables greater flexibility in antenna separation design and frequency range, because we only need to avoid pattern overlap over a small range of angles, not all the way from −90 degrees to +90 degrees.

Figures 7, 7A:
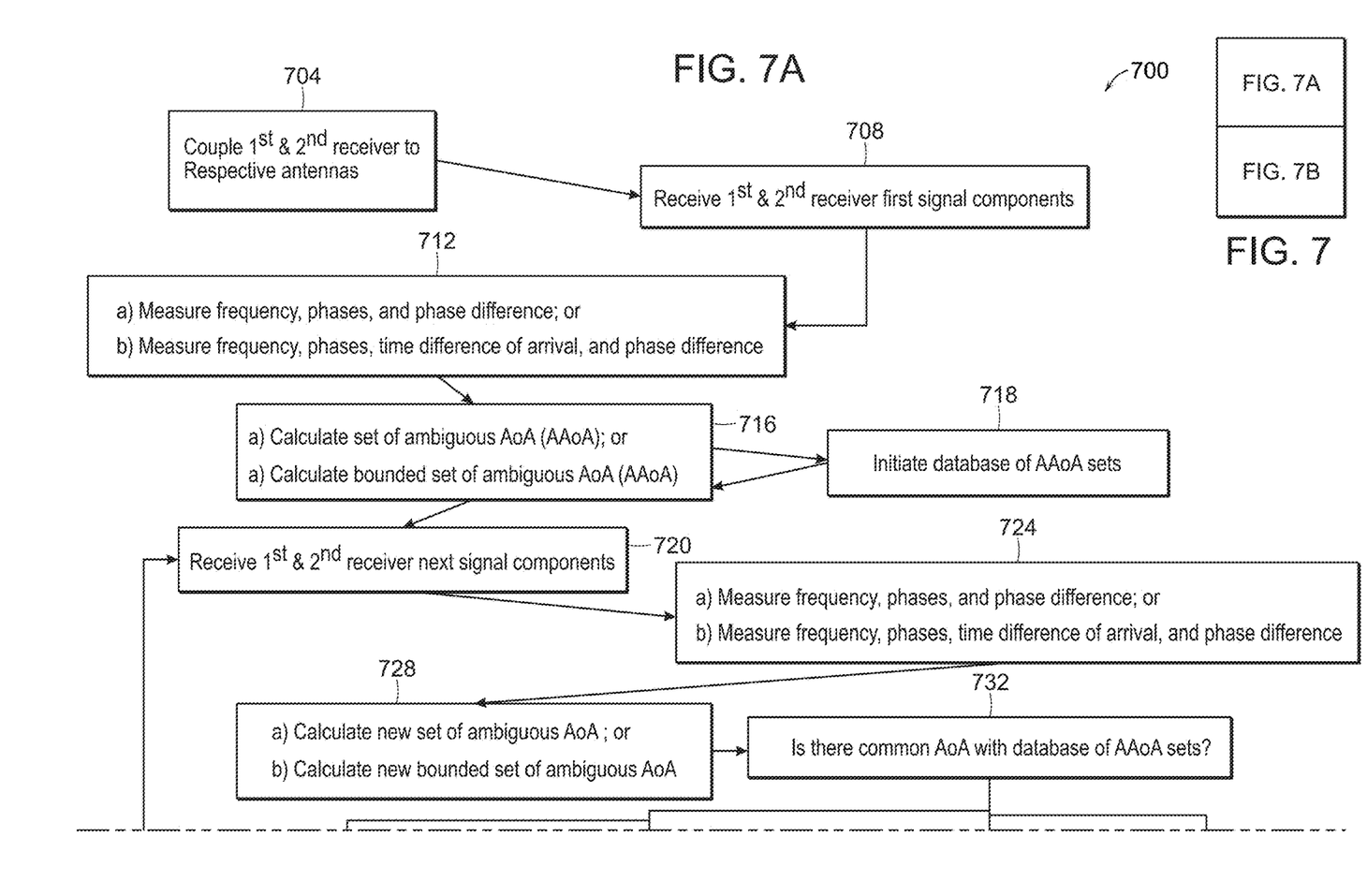
FIGS. 7, 7A and 7B represent a method of determining an unambiguous angle of arrival (AoA) of a signal from an emitter in accordance with an aspect of the present disclosure.
Figure 7B:
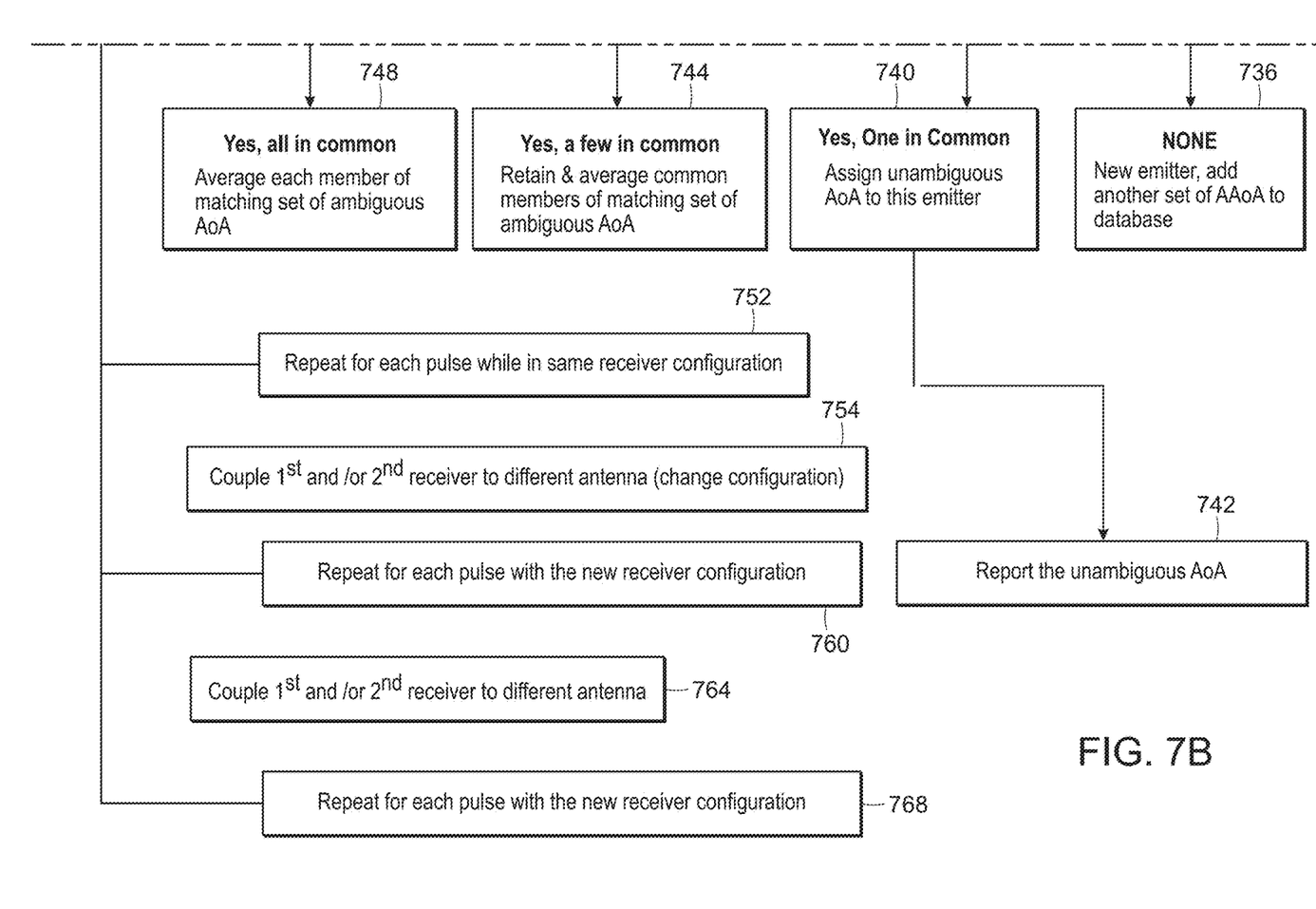

Thus, referring back to the method 700 shown in FIGS. 7, 7A and 7B, the process begins with steps 704, 708 as before, however, at step 712(*b*), the frequency f, phase φ, time difference of arrival and phase difference Δφ between the receivers are measured or calculated. At step 716(*b*), a bounded set of ambiguous angle of arrival (AAoA) of the first signal as a function of the measured frequency, phases, time difference of arrival and phase difference is calculated and, step 718, a database of AAoA sets is initiated.

At step 720, the first and second receivers 308-1, 308-2 receive first and second components of a next signal from the emitter 504 detected at the corresponding antenna. The frequency, phase, time difference of arrival and phase difference are measured or calculated, step 724(*b*), and a new set of ambiguous angle of arrival (AAoA) is calculated, step 728(*b*). Steps 732-768 are then performed as set forth above.

Figure 6:
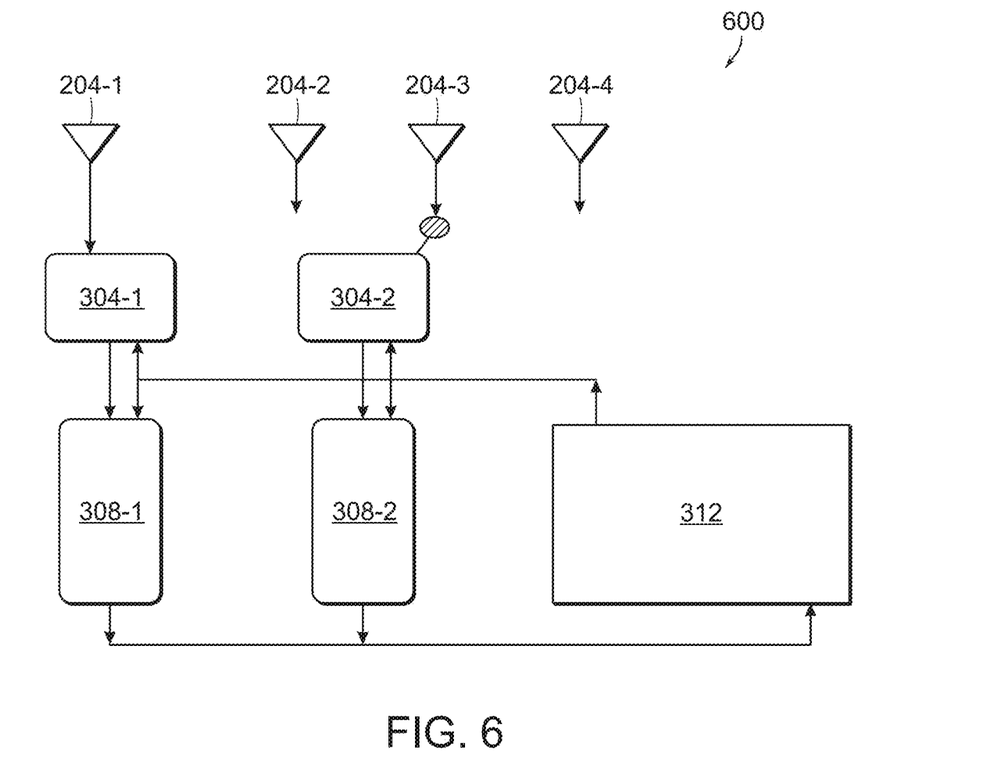
FIG. 6 is a block diagram of a system for determining an unambiguous angle of arrival (AoA) of a signal from an emitter in accordance with another aspect of the present disclosure.

Another system 600 for determining an unambiguous angle of arrival (AoA) of a signal from an emitter in accordance with another aspect of the present disclosure is represented in FIG. 6. Here, the first antenna 204-1 is coupled to the first switch 304-1, which is coupled to the first receiver 308-1. The remaining antennas 204-2-204-4 are coupled to the second switch 304-2, which is coupled to the second receiver 308-2. As the first antenna 204-1 is coupled only to the first receiver 308-1, the first switch 304-1 could be removed.

Operation of the system 600 is similar to that which has been set forth herein except that the first receiver 308-1 is only receiving the signal from the first antenna 204-1 while the second receiver 308-2 cycles through the other antennas 204-2 through 204-4.

Various implementations of the above-described systems and methods described may be provided in digital electronic circuitry, in computer hardware, firmware, and/or software. An implementation can be as a computer program product, e.g., a computer program tangibly embodied in an information carrier. The implementation can, for example, be in a machine-readable storage device, for execution by, or to control the operation of, data processing apparatus. The implementation can, for example, be a programmable processor, a computer, and/or multiple computers.

The above-described implementations generally depict a computer implemented system employing at least one processor or processing unit executing program steps out of at least one memory to obtain the functions herein described. It should be recognized that the presently described methods may be implemented via the use of software, firmware or alternatively, implemented as a dedicated hardware solution such as an FPGA (field programmable gate array) and/or an ASIC (application specific integrated circuit). Modules, subroutines, and software agents can refer to portions of the computer program, the processor or processing unit, the special circuitry, software, and/or hardware that implements that functionality.

A computer program can be written in any form of programming language, including compiled and/or interpreted languages, and the computer program can be deployed in any form, including as a stand-alone program or as a subroutine, element, and/or other unit suitable for use in a computing environment.

As utilized, the one or more processing units may represent, for example, a CPU-type processing unit, a GPU-type processing unit, a field-programmable gate array ("FPGA"), digital signal processor(s) ("DSP"), or other hardware logic components that may, in some instances, be driven by a central processing unit ("CPU").

The computer-readable medium may store instructions executable by the one or more processing units and may include computer storage media and/or communication media. Computer storage media may include one or more of volatile memory, nonvolatile memory, and/or other persistent and/or auxiliary computer storage media.

It is to be understood that the disclosure is not limited in its application to the details of construction and the arrangement of the components set forth herein or illustrated in the drawings as it is capable of implementations or of being practiced or carried out in various ways. Also, it is to be understood that the phraseology and terminology employed herein are for the purpose of description only and should not be regarded as limiting.

Certain features, which are, for clarity, described in the context of separate implementations, may also be provided in combination in a single implementation. Conversely, various features, which are, for brevity, described in the context of a single implementation, may also be provided separately or in any suitable sub-combination.

The present disclosure is illustratively described in reference to the disclosed implementations. Various modifications and changes may be made to the disclosed implementations by persons skilled in the art without departing from the scope of the present disclosure as defined in the appended claims.

What is claimed is:

1. A method of determining an unambiguous angle of arrival (AoA) of a signal from an emitter, the method comprising:
   (a) coupling a first receiver to an antenna in a first sub-set of antennas of an array of antennas, wherein the first receiver is only coupled to one antenna at a time;
   (b) coupling a second receiver to an antenna in a second sub-set of antennas of the array, wherein no antenna in the second sub-set is in the first sub-set of antennas and wherein the second receiver is only coupled to one antenna at a time;
   (c) receiving, respectively, at the first and second receivers, first and second components of a first signal from the emitter detected at the corresponding antenna;
   (d) measuring a frequency and phase difference between the received first and second components;
   (e) calculating a set of ambiguous angles of arrival (AAoA) of the first signal as a function of the measured phase difference;
   (f) collecting the calculated AAoA into a set of AAoAs associated with a combination defined by: (i) the first signal, (ii) the antenna to which the first receiver is connected and (iii) the antenna to which the second receiver is connected;
   (h) coupling the second receiver to another antenna of the second sub-set of antennas and repeating steps (c)-(f) a predetermined number of times;
   (i) repeating step (h) a predetermined number of times; and
   (j) identifying an AAoA common to each set of AAoAs as the unambiguous AoA of the first signal.

2. The method of claim 1, further comprising:
prior to step (h), repeating steps (c)-(f) a predetermined number of times.

3. The method of claim 1, wherein step (h) further comprises:
(h)(1) coupling the first receiver to another antenna of the first sub-set of antennas, wherein:
each of coupling the first receiver to another antenna of the first sub-set of antennas and coupling the second receiver to another antenna of the second sub-set of antennas is performed at aperiodic intervals.

4. The method of claim 1, wherein:
the antennas in the array are linearly arranged, and
wherein a distance between each pair of linearly adjacent antennas is different from a distance between any other pair of adjacent antennas.

5. The method of claim 4, wherein the different distances between the antennas are mutually prime.

6. The method of claim 1, wherein:
coupling the second receiver to any one other antenna of the second sub-set of antennas is performed at aperiodic intervals, and
wherein coupling the second receiver to any one other antenna of the second sub-set of antennas is performed asynchronously and with a variable period.

7. The method of claim 1, further comprising:
(d)(1) measuring a time difference of arrival (TDOA) between the received first and second components,
wherein collecting the calculated AAoA further comprises:
collecting the calculated AAoA into the set if the values are within a predetermined TDOA range of the measured TDOA.

8. The method of claim 7, wherein the predetermined TDOA range defines a subset of the AAoA that fits within a predetermined range of angles of arrival.

9. A method of determining an unambiguous angle of arrival (AoA) of a signal from an emitter, the method comprising:
(a) switchably coupling a first receiver to only one antenna at a time, the one antenna in a first sub-set of antennas of an array of antennas;
(b) switchably coupling a second receiver to only one antenna at a time, the one antenna in a second sub-set of antennas of the antenna array, wherein no antenna in the first sub-set is in the second sub-set of antennas;
(c) receiving, respectively, at the first and second receivers, first and second components of a first signal from the emitter detected at the corresponding antenna;
(d) measuring a phase difference between the received first and second components;
(e) calculating an ambiguous angle of arrival (AAoA) of the first signal as a function of the measured phase difference;
(f) collecting the calculated AAoA into a set of AAoAs associated with a combination defined by: (i) the first signal, (ii) the antenna to which the first receiver is connected and (iii) the antenna to which the second receiver is connected;
(h) switchably coupling one or both of the first and second receivers to any one other antenna of the respective sub-set of antennas and repeating steps (c)-(f) a predetermined number of times;
(i) repeating step (h) a predetermined number of times; and
(j) identifying an AAoA common to each set of AAoAs as the unambiguous AoA of the first signal.

10. The method of claim 9, further comprising:
prior to step (h), repeating steps (c)-(f) a predetermined number of times.

11. The method of claim 9, wherein:
the antennas in the array are linearly arranged, and
wherein a distance between each pair of linearly adjacent antennas is different from a distance between any other pair of linearly adjacent antennas.

12. The method of claim 11, wherein the different distances between the antennas are mutually prime.

13. The method of claim 9, wherein step (h) further comprises:
switchably coupling one or both of the first and second receivers to any one other antenna of the respective sub-set of antennas at one of: (1) aperiodic intervals or (2) asynchronously and with a variable period.

14. The method of claim 9, further comprising:
(d)(1) measuring a time difference of arrival (TDOA) between the received first and second components,
wherein collecting the calculated AAoA further comprises:
collecting the calculated AAoA into the set if the measured TDOA is within a predetermined TDOA range.

15. The method of claim 14, wherein the predetermined TDOA range defines a subset of the AAoA that fits within a predetermined range of angles of arrival.

16. A system for determining an unambiguous angle of arrival (AoA) of a signal from an emitter, the system comprising:
an array of linearly arranged antennas comprising first and second sub-sets of antennas, wherein no antenna in the second sub-set is in the first sub-set;
a switching device coupled to the antenna array and configured to: switchably couple one first sub-set antenna at a time to a first output and switchably couple one second sub-set antenna at a time to a second output;
a first receiver coupled to the first output of the switching device;
a second receiver coupled to the second output of the switching device; and
a processor, coupled to the switching device and the first and second receivers, configured to implement a method of:
(a) coupling, via the switching device, the first receiver to an antenna in the first sub-set of antennas;
(b) coupling, via the switching device, the second receiver to an antenna in the second sub-set of antennas;
(c) receiving, respectively, from the first and second receivers, first and second components of a first signal from the emitter detected at the corresponding antenna;
(d) measuring a phase difference between the received first and second components;
(e) calculating an ambiguous angle of arrival (AAoA) of the first signal as a function of the measured phase difference;
(f) collecting the calculated AAoA into a set of AAoAs associated with a combination defined by: (i) the first signal, (ii) the antenna to which the first receiver is connected and (iii) the antenna to which the second receiver is connected;
(h) coupling, via the switching device, the second receiver to another antenna of the second sub-set of antennas and repeating steps (c)-(f) a predetermined number of times;

(i) repeating step (h) a predetermined number of times; and (j) identifying an AAoA common to each set of AAoAs as the unambiguous AoA of the first signal.

17. The system of claim 16, the process is further configured to:

prior to step (h), repeat steps (c)-(f) a predetermined number of times.

18. The system of claim 16, wherein step (h) further comprises:

(h)(1) coupling the first receiver to another antenna of the first sub-set of antennas, and wherein each of coupling the first receiver to another antenna of the first sub-set of antennas and coupling the second receiver to another antenna of the second sub-set of antennas is performed at aperiodic intervals.

19. The system of claim 16, wherein:

a distance between each pair of adjacent antennas is different from a distance between any other pair of adjacent antennas.

20. The system of claim 19, wherein the different distances between the antennas are mutually prime.

21. The system of claim 16, wherein:

coupling the second receiver to any one other antenna of the second sub-set of antennas is performed at one of: (1) aperiodic intervals or (2) asynchronously and with a variable period.

22. The system of claim 16, further comprising:

(d)(1) measuring a time difference of arrival (TDOA) between the received first and second components, wherein collecting the calculated AAoA further comprises:

collecting the calculated AAoA into the set if the measured TDOA is within a predetermined TDOA range.

23. The system of claim 22, wherein the predetermined TDOA range defines a subset of the AAoA that fits within a predetermined range of angles of arrival.

* * * * *